(12) United States Patent
Adamski et al.

(10) Patent No.: US 10,723,338 B2
(45) Date of Patent: Jul. 28, 2020

(54) CONTROL VALVE OF A COMPRESSED AIR SYSTEM

(71) Applicant: WABCO Europe BVBA, Brussels (BE)

(72) Inventors: Krzysztof Adamski, Wroclaw (PL);
Reiner Hölscher, Seelze (DE);
Gerhard Martini, Gehrden (DE);
Karl-Heinz Riediger-Janisch,
Hannover (DE)

(73) Assignee: WABCO Europe BVBA, Brussels (BE)

( * ) Notice: Subject to any disclaimer, the term of this patent is extended or adjusted under 35 U.S.C. 154(b) by 0 days.

(21) Appl. No.: 16/377,819

(22) Filed: Apr. 8, 2019

(65) Prior Publication Data
US 2019/0315329 A1 Oct. 17, 2019

(30) Foreign Application Priority Data

Apr. 16, 2018 (DE) .................. 10 2018 108 975

(51) Int. Cl.
| | | |
|---|---|---|
| *B60T 15/02* | (2006.01) | |
| *B60T 15/18* | (2006.01) | |
| *F16J 15/3232* | (2016.01) | |
| *F16J 15/3236* | (2016.01) | |

(52) U.S. Cl.
CPC .......... *B60T 15/027* (2013.01); *B60T 15/181* (2013.01); *F16J 15/3232* (2013.01); *F16J 15/3236* (2013.01)

(58) Field of Classification Search
CPC .... B60T 15/027; B60T 15/182; B60T 15/181; F16J 15/3232; F16J 15/3236

USPC .......................................................... 251/62
See application file for complete search history.

(56) References Cited

U.S. PATENT DOCUMENTS

| | | | | |
|---|---|---|---|---|
| 553,738 | A * | 1/1896 | Raynsford | ........... F16J 15/3232 |
| | | | | 277/550 |
| 7,059,688 | B2 * | 6/2006 | Roether | ................ B60T 13/683 |
| | | | | 137/627.5 |
| 10,179,579 | B2 * | 1/2019 | Didwiszus | ............ B60T 13/683 |

FOREIGN PATENT DOCUMENTS

| | | | | |
|---|---|---|---|---|
| DE | 688624 | C * | 2/1940 | .......... F16J 15/3232 |
| DE | 10120321 | A1 | 11/2002 | |
| DE | 102009040759 | A1 | 3/2011 | |
| DE | 102014009179 | A1 | 12/2015 | |
| FR | 1125110 | A * | 10/1956 | ........... F16J 15/3232 |

* cited by examiner

*Primary Examiner* — Umashankar Venkatesan
(74) *Attorney, Agent, or Firm* — Dickinson Wright PLLC (57) ABSTRACT

A control valve (3) of a compressed air system of a vehicle has a control piston (22), guided in an axially movable manner in a housing cylinder (25), two pressure chambers (32, 34) separated from one another by the control piston (22), which is sealed by at least one sealing ring (37) arranged on the outer circumference of the control piston (22). The sealing ring (37) is a radial sealing ring having an axial length which substantially corresponds to the axial thickness of the control piston (22). The sealing ring (37) has, on each of the two axial edges thereof, one respective radially obliquely outwardly directed sealing lip (39, 40) which is in contact with the inner wall (38) of the cylinder (25), and that a plurality of guide members (50) distributed over the circumference and formed between the two sealing lips (39, 40) on the sealing ring (37).

11 Claims, 5 Drawing Sheets

CONTROL VALVE OF A COMPRESSED AIR SYSTEM

TECHNICAL FIELD

The present disclosure relates to a control valve of a compressed air system of a vehicle, comprising at least one control piston, which is guided in an axially movable manner in a cylinder which is fixed to the housing, two pressure chambers being separated from one another by the control piston, which is sealed by at least one sealing ring arranged on the outer circumference of the control piston.

BACKGROUND

Road vehicles, in particular heavy goods vehicles and rail vehicles, are often equipped with a compressed air supply system, by which compressed-air-consuming circuits, such as service brake circuits, a handbrake circuit, an air suspension circuit, a leveling adjustment circuit or auxiliary consumer circuits are supplied with compressed air. In order to adjust the working pressure of compressed-air consumers, control valves comprising at least one control piston guided in an axially movable manner in a cylinder fixed to the housing are frequently used. The control piston, which is sealed by at least one sealing ring arranged on the outer circumference of the control piston, separates two pressure chambers from one another. One of the pressure chambers is conventionally a working pressure chamber, which is connected to a working pressure connection of a consumer and, depending on the axial position of the control piston, can be connected to a supply pressure connection or to a vent outlet or shut off from both. The other pressure chamber can be a control pressure chamber or an equalizing chamber connected to the surroundings by a vent hole. The control piston can be displaced mechanically, pneumatically or electromagnetically to adjust the axial position thereof. In a compressed-air brake system of a vehicle, a control valve of this type incorporated in a piston design can be used as a motor vehicle brake valve, as a trailer control valve, as a trailer brake valve or as a relay valve.

DE 101 20 321 B4 discloses a relay valve of a compressed-air brake system, comprising a pneumatically displaceable control piston, in which the control piston is guided in an axially movable manner in a cylinder of a valve housing and separates a working pressure chamber from a control pressure chamber. The control pressure chamber can alternately have a control pressure applied thereto or can be switched so as to be unpressurized by a magnetic valve. To seal the control piston, a radial sealing ring comprising a fastening web in the form of an outer annular web is inserted in a fastening groove in the form of an annular groove in the inner wall of the cylinder, and the piston is provided with a correspondingly long, cylindrical outer wall acting as a sealing surface.

DE 10 2009 040 759 A1 describes an additional relay valve of a compressed-air brake system, comprising a pneumatically displaceable control piston, in which the control piston is guided in an axially movable manner in a cylinder of a valve housing and separates a working pressure chamber from a control pressure chamber. The control pressure chamber can alternately have a control pressure applied thereto or can be switched so as to be unpressurized by a pilot valve, which is not described in greater detail. To seal the control piston, an O-ring is inserted in an annular groove formed in the cylindrical outer wall of the control piston. For the axial guidance thereof, the control piston is mounted by a relatively long, central mounting pin so as to slide in a central mounting hole of a housing cover.

A similar relay valve of a compressed-air brake system comprising a pneumatically displaceable control piston is also known from DE 10 2014 009 179 A1. The control piston is guided in an axially movable manner in a cylinder of a valve housing and in this case as well separates a working pressure chamber from a control pressure chamber. To seal the control piston, a sealing ring having a Z-shaped profile is inserted in an annular groove formed in the cylindrical outer wall of the control piston. For the axial guidance thereof, the control piston is mounted so as to slide via a central guide sleeve on a mounting pin fixed to the housing.

As a result of the sliding guidance thereof by a central guide sleeve or a central mounting pin, the control pistons of the known control valves each have a disadvantageously great axial height, by which in particular the axial dimensions of the relevant control valve are increased. In addition, the sealing of the pressure chambers separated by the control piston by only one respective sealing ring arranged on the outer circumference of the control piston is designed to be relatively weak in the two last-mentioned embodiments of the known control valves.

SUMMARY

The problem addressed by the present disclosure is therefore that of proposing a control piston comprising a radial guide which requires less axial installation space and having improved sealing of the pressure chambers separated by the control piston.

This problem is solved by a radial sealing ring having an axial length which substantially corresponds to the axial thickness of the control piston, in that the sealing ring has, on the two axial edges thereof, a respective radially obliquely outwardly directed sealing lip which is in contact with the inner wall of the cylinder, and in that a plurality of guide members, arranged so as to be distributed over the circumference, are formed between the two sealing lips on the sealing ring.

Accordingly, the present disclosure deals with a control valve of a compressed air system of a vehicle, comprising at least one control piston guided in an axially movable manner in a cylinder fixed to the housing, with two pressure chambers being separated from one another by the control piston, which is sealed by at least one sealing ring arranged on the outer circumference of the control piston.

According to the present disclosure, the sealing ring is in the form of a radial sealing ring, the axial length of which substantially corresponds to the axial thickness of the control piston. The sealing ring has, on each of the two axial edges thereof, one respective radially obliquely outwardly directed sealing lip which is in contact with the inner wall of the cylinder, which inner wall is effective as a sealing surface, and therefore the pressure chambers which are separated from one another by the control piston are sealed well with respect to one another. Between the two sealing lips of the sealing ring, a plurality of guide members which are arranged so as to be distributed over the circumference, or at least one circumferential guide member, are arranged, by means of which the control piston is guided so as to slide on the inner wall of the cylinder which is fixed to the housing.

Thus, the radial guidance of the control piston by means of a central guide sleeve or a central guide pin can be omitted, or a sliding guide of this type can be designed to be axially shorter than was previously conventional. The required axial overall height of the control piston according to the present disclosure is thus smaller so that the relevant control valve is designed to be more compact at least in the axial dimensions thereof. In addition, the sealing of the pressure chambers is supported by the guide member or members integrated on the sealing ring in that a tilted or eccentric position of the control piston is prevented, by which at least one of the sealing lips could be strongly indented locally on the circumference thereof, and the other or the same sealing lip could be pressed more weakly in the diagonally opposite direction against the inner wall of the cylinder or even lifted off the inner wall.

For the rigid fastening thereof on the control piston, the sealing ring, according to one development, has a fastening groove in the form of a radial annular groove on the inner face thereof, which groove, in the mounted state, encompasses a fastening web which is arranged on the outer circumference of the control piston and is in the form of a radial annular web.

In the embodiment of the sealing ring comprising a plurality of guide members arranged so as to be distributed over the circumference, the guide members are preferably in the form of radially raised, round guide knobs having a radially outer cylindrical sliding surface, which are arranged axially centrally between the sealing lips.

In another embodiment of the sealing ring, it is provided that the guide member of the sealing ring is in the form of a radially raised annular web having an outer cylindrical sliding surface which is arranged axially centrally between the sealing lips and has interruptions over the circumference.

To divert compressed air which has penetrated one of the two sealing lips as a result of a leakage, between the outer circumference of the piston and the radial inner face of the sealing ring, an annular vent space is advantageously formed, which is connected by means of at least one radial vent hole arranged in the sealing ring to an intermediate space enclosed between the sealing lips of the sealing ring and the inner wall of the cylinder, and to a vent channel formed in the control piston.

The annular vent space is preferably delimited by a radial annular groove, which is formed axially centrally in the bottom wall of the fastening groove of the sealing ring.

Alternatively, it is also possible for the annular vent space to be delimited by a radial annular groove, which is formed axially centrally in the outer wall of the fastening web of the control piston.

In one embodiment of the sealing ring comprising a plurality of guide members arranged so as to be distributed over the circumference, the vent holes in the sealing ring are expediently arranged in the circumference substantially centrally between the guide members to allow an unimpeded inflow of compressed air which has penetrated the intermediate space from both axial directions.

In one embodiment of the sealing ring comprising a circumferential, annular-web-shaped guide member, it is provided that the guide member is interrupted in the region of the vent holes of the sealing ring to allow an unimpeded inflow of compressed air which has penetrated the intermediate space from both axial directions.

The vent channel is preferably in the form of a cylindrical tube or of an annular cylindrical tube, which is formed centrally in or coaxially with the central axis of the control piston in the same. The annular vent space is then connected to the vent channel by at least one radial vent hole formed in the control piston.

The present disclosure will be described in greater detail below with reference to two exemplary embodiments shown in the accompanying drawings. The drawings are provided herewith for purely illustrative purposes and are not intended to limit the scope of the present invention.

DETAILED DESCRIPTION OF THE DRAWINGS

Figure 5:
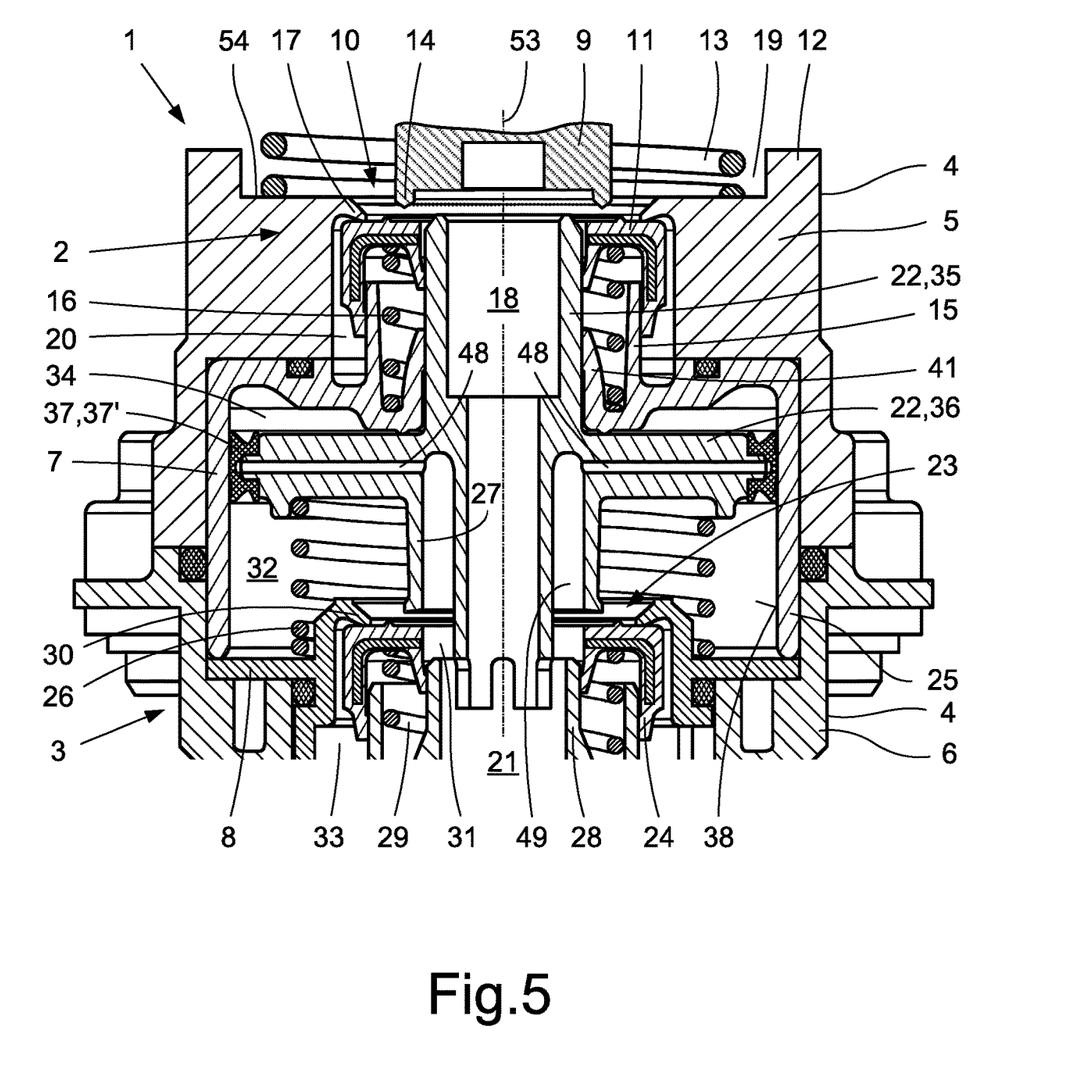
FIG. 5 is a partial central sectional view of the control valve according to the present disclosure.

FIG. 5 is a detail of a central section through a valve unit 1, which has two control valves 2, 3 configured in a piston design. The valve unit 1 can be used as a trailer control valve or as a trailer brake valve for example in a compressed-air brake system of a motor vehicle comprising two brake circuits. The valve unit 1 has a valve housing 4, which has an upper housing part 5 and a lower housing part 6, which are interconnected. In a graduated-cylindrical interior enclosed by the two housing parts 5, 6, a generally cup-shaped cylindrical upper housing insert 7 and a generally cup-shaped cylindrical lower housing insert 8 are arranged in a non-displaceable manner.

The first control valve 2, which is shown only in part in FIG. 5, is arranged in the upper part of the valve housing 4 and has a control piston 9 and a sealing piston 11, cooperating with the control piston, of an upper poppet valve 10. The control piston 9 is guided in an axially movable manner in a cylinder 12 of the upper housing part 5, is stressed axially upward by a compression spring 13 in the form of a helical spring, which is supported on an indentation 54 of the upper housing part 5 and has, on the lower face thereof, an annular-web-shaped inner valve seat 14 of the upper poppet valve 10.

The sealing piston 11 of the upper poppet valve 10 is guided in an axially movable manner on a cylindrical guide portion 15 of the upper housing insert 7 and is stressed axially upward toward an annular-web-shaped outer valve seat 17 arranged in the upper housing part 5 by a compression spring 16 in the form of a helical spring, which is supported on the upper housing insert 7. A working pressure chamber 19 enclosed by the control piston 9 in the cylinder 12 of the upper housing part 5, to which for example a brake line leading to the wheel brake cylinders of a brake circuit can be connected, depending on the axial position of the control piston 9, can be connected to an annular supply pressure chamber 20 located underneath the outer valve seat 17 between the upper housing part 5 and the upper housing insert 7, or can be connected by a central vent channel 18 to a vent pressure chamber 21 arranged centrally at the bottom in the valve housing 4, or can be blocked with respect to the two pressure chambers 20, 21. The vent channel 18 is formed centrally in and coaxially with the central axis 53 of the control piston 22 in the same.

When the inner valve seat 14 of the control piston 9 is in contact with the sealing piston 11 of the upper poppet valve 10 and has pushed the piston away from the outer valve seat 17, the working pressure chamber 19 is connected to the supply pressure chamber 20 which is connected to a compressed air source or a supply pressure line, so that the working pressure in the working pressure chamber 19 is increased. If the inner valve seat 14 of the control piston 9 has lifted off the sealing piston 11 of the upper poppet valve 10, and the sealing piston 11 is in contact with the outer valve seat 17, the working pressure chamber 19 is connected to the vent pressure chamber 21 which is connected to the surroundings by a sound damper (not shown), so that the working pressure in the working pressure chamber 19 is reduced. When the inner valve seat 14 of the control piston 9 is in contact with the sealing piston 11 of the upper poppet valve 10 without lifting the sealing piston off the outer valve seat 17, the working pressure chamber 19 is blocked with respect to the supply pressure chamber 20 and the vent pressure chamber 21 so that the working pressure in the working pressure chamber 19 is kept constant.

The second control valve 3, which is shown in full in FIG. 5, is arranged in the lower part of the valve housing 4 and has a control piston 22 and a sealing piston 24, cooperating with the control piston, of a lower poppet valve 23. The control piston 22 is guided in an axially movable manner in a cylinder 25 of the upper housing insert 7, is stressed axially upward by a compression spring 26 in the form of a helical spring, which is supported on the lower housing insert 8 and has, on the lower face thereof, an annular-web-shaped inner valve seat 27 of the lower poppet valve 23. The sealing piston 24 of the lower poppet valve 23 is guided in an axially movable manner on a cylindrical guide portion 28 of the lower housing part 6 and is stressed axially upward toward an annular-web-shaped outer valve seat 30 arranged in the lower housing insert 8 by a compression spring 29 in the form of a helical spring, which is supported on the lower housing part 6. A working pressure chamber 32 enclosed by the control piston 22 in the cylinder 25 of the upper housing insert 7, depending on the axial position of the control piston 22, can be connected to an annular supply pressure chamber 33 located underneath the outer valve seat 30 between the lower housing insert 8 and the lower housing part 6, or can be connected by a central opening 31 in the sealing piston 24 of the lower poppet valve 23 to the vent space 21, or can be blocked with respect to the two pressure chambers 21, 33.

The axial position of the control piston 22 can be adjusted in that a control pressure which is effective in a control pressure chamber 34 is adjusted in a suitable manner for example by means of a magnetic valve. Axially opposite the working pressure chamber 32, the control pressure chamber 34 is enclosed by the control piston 22 in the cylinder 25 of the upper housing insert 7. When the inner valve seat 27 of the control piston 22 is in contact with the sealing piston 24 of the lower poppet valve 23 and has pushed the piston away from the outer valve seat 30, the working pressure chamber 32 is connected to the supply pressure chamber 33 which is connected to a compressed air source, so that the working pressure in the working pressure chamber 32 is increased. If the inner valve seat 27 of the control piston 22 has lifted off the sealing piston 24 of the lower seat valve 23, and the sealing piston 24 is in contact with the outer valve seat 30, the working pressure chamber 32 is connected to the vent pressure chamber 21 so that the working pressure in the working pressure chamber 32 is reduced. This operating position is shown in FIG. 5. When the inner valve seat 27 of the control piston 22 is in contact with the sealing piston 24 of the lower poppet valve 23 without lifting the piston off the outer valve seat 30, the working pressure chamber 32 is blocked with respect to the supply pressure chamber 33 and the vent pressure chamber 21 so that the working pressure in the working pressure chamber 32 is kept constant.

The control piston 22 of the second control valve 3 has a central tubular body 35 at the top, and under the body, a circular-disk-shaped piston body 36, which are integrally connected to one another. The vent channel 18 of the first control valve 2 is located inside the tubular body 35. The piston body 36 separates the control pressure chamber 34 from the working pressure chamber 32 and, for sealing, has a sealing ring 37, 37' arranged on the outer circumference thereof. The sealing ring 37, 37' is in the form of a radial sealing ring having an axial length which substantially corresponds to the axial thickness of the piston body 36. The term "substantially" in this context is defined to allow for variations within a range of +/−20%, preferably within +/−10%, in a relaxed, uncompressed state of the radial sealing ring. The sealing ring 37, 37' has, on each of the two axial edges thereof, one respective radially obliquely outwardly directed first and second sealing lip 39, 40 respectively, which are in contact with the inner wall 38 of the cylinder 25 of the upper housing insert 7, which inner wall is effective as a sealing surface. Between the two sealing lips 39, 40, the sealing ring 37, 37' is provided with a plurality of guide members 50 arranged so as to be distributed over the circumference, or with a circumferential guide member 51, which are not visible in FIG. 5. In addition, by means of a sliding guide of the tubular body 35 of the control piston 22 in a cylindrical guide portion 41 of the upper housing insert 7 and by means of a helical spring 26 which is radially supported on the piston body 36 and the lower housing insert 8, the control piston 22 is thus also radially guided by means of the sealing ring 37, 37'.

As can be better seen in FIGS. 1 to 4, for the interlocking fixing thereof on the control piston 22, the sealing ring 37, 37' has, on the radial inner face thereof, a fastening groove 42 in the form of a radial groove, which encompasses a fastening web 43 which is in the form of a radial annular web and is formed on the outer circumference of the piston body 36. Between the outer circumference of the piston body 36 and the radial inner face of the sealing ring 37, 37', an annular vent space 46, 47 is formed, which is connected by means of a plurality of radial vent holes 45 formed in the sealing ring 37, 37' to an intermediate space 44 enclosed between the two sealing lips 39, 40 of the sealing ring 37, 37' and the inner wall 38 of the cylinder 25 of the upper housing insert 7, and to a vent channel 49 arranged in the control piston 22.

The vent channel 49 is in the form of an annular cylindrical tubular body, which is arranged in the lower part of the control piston 22 coaxially around the central tubular body 35 and is closed at the top and which is open at the bottom, opening into the vent pressure chamber 21. The annular vent space 46, 47 is connected to the vent channel 49 by means of a plurality of radial vent holes 48 arranged in the piston body 36.

Figure 1:
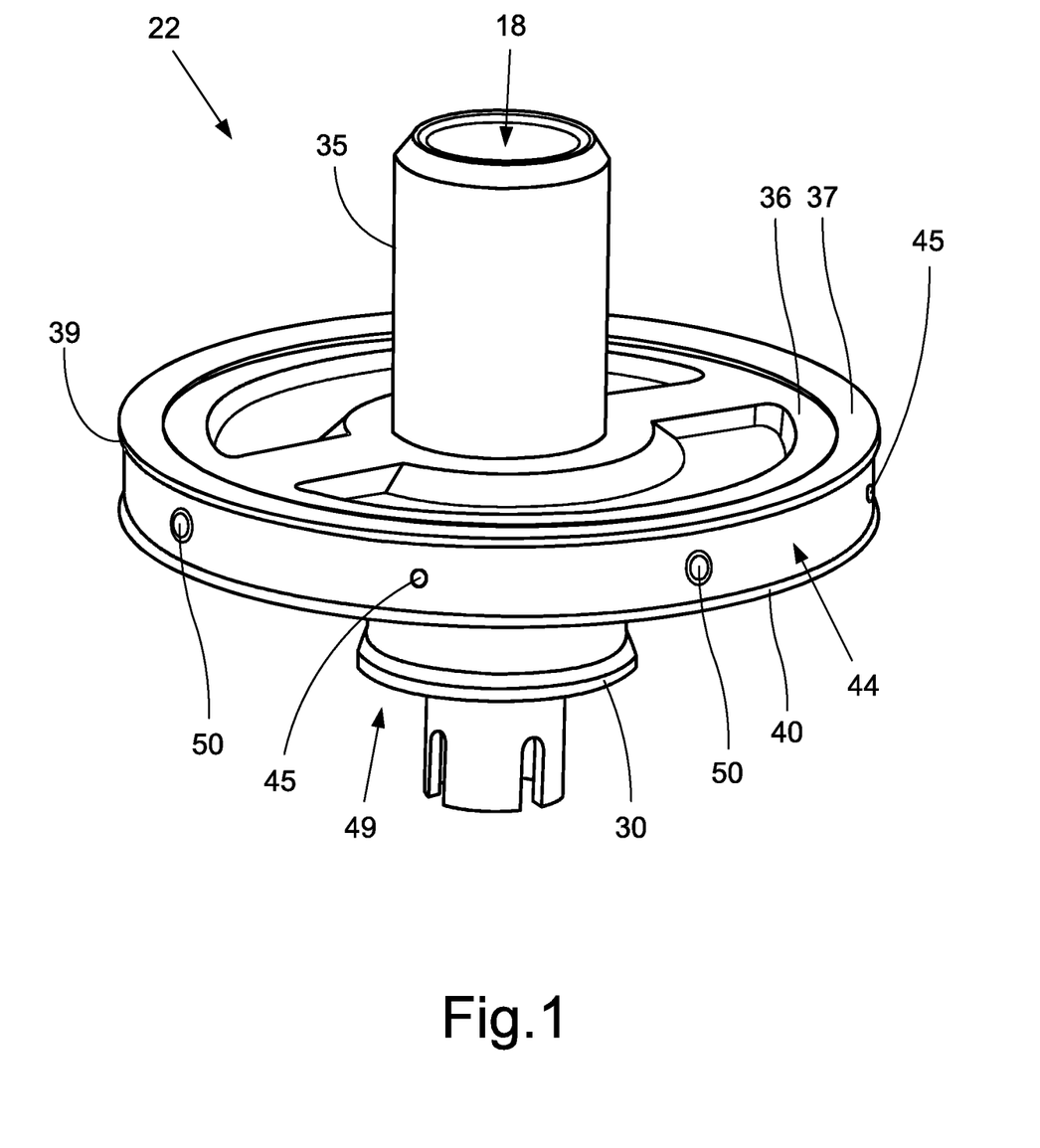
FIG. 1 is a perspective view of a first embodiment of a control piston of the control valve according to the present disclosure.

Two preferred embodiments of the sealing ring 37, 37' are described in greater detail below with reference to the perspective views of the control piston 22 in FIG. 1 and FIG. 2. In the first embodiment according to FIG. 1, the sealing ring 37 has, axially centrally between the two sealing lips 39, 40, a plurality of, in the present case for example four, guide members 50 which are arranged so as to be distributed over the circumference, which are radially raised and, in the shown embodiment, round guide knobs having radially outer cylindrical sliding surfaces. Circumferentially, substantially centrally between two respective adjacent guide members 50, one respective radial vent hole 45 is formed in the sealing ring 37 so that an inflow of compressed air, which has penetrated the intermediate space 44 past the two sealing lips 39, 40, to the vent holes 45 is possible.

Figure 2:
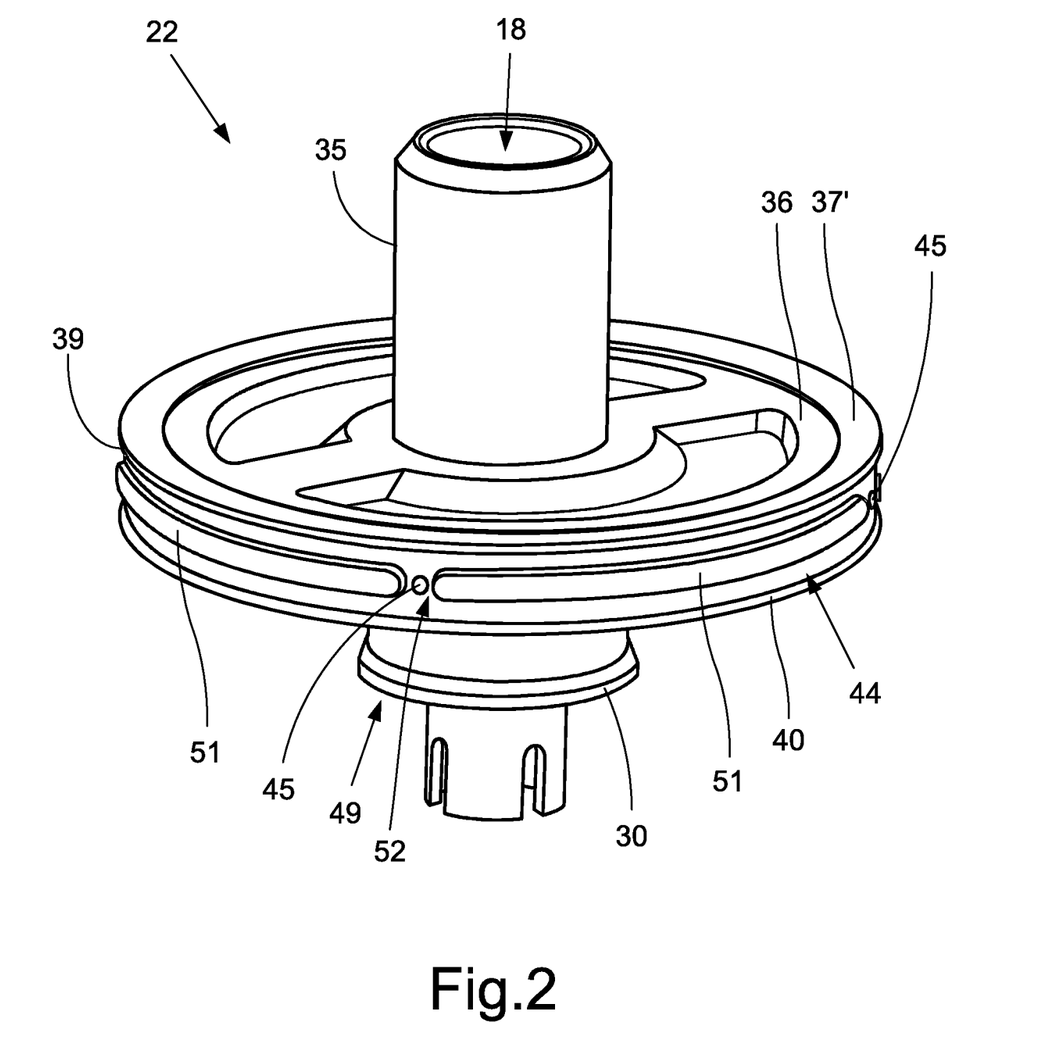
FIG. 2 is a perspective view of a second embodiment of a control piston of the control valve according to the present disclosure.

In the second embodiment according to FIG. 2, the sealing ring 37' has, axially centrally between the two sealing lips 39, 40, a circumferential guide member 51, which is in the form of a radially raised annular web having an outer cylindrical sliding surface. To be precise, the guide member 51 consists of a plurality of relatively long annular web segments which are at a short distance from one another by interruptions 52. Distributed over the circumference, a plurality of, in the present case for example four, radial vent holes 45 are formed in the sealing ring 37', in the respective regions where the guide member 51 is interrupted to allow an inflow of compressed air that has penetrated the intermediate space 44 past the two sealing lips 39, 40.

Figure 3:
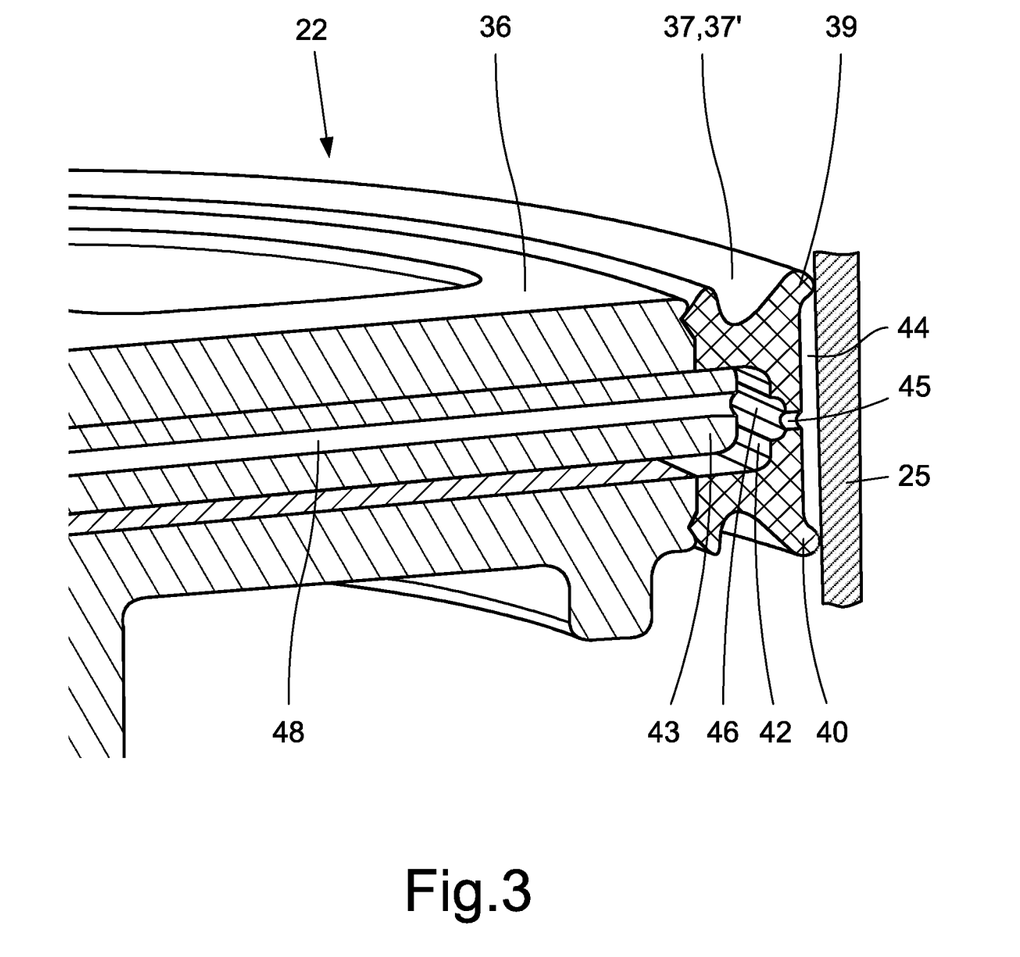
FIG. 3 is a perspective, sectional view of a first variant of the two embodiments of the control piston of the control valve according to the present disclosure according to FIG. 1 and FIG. 2.
Figure 4:
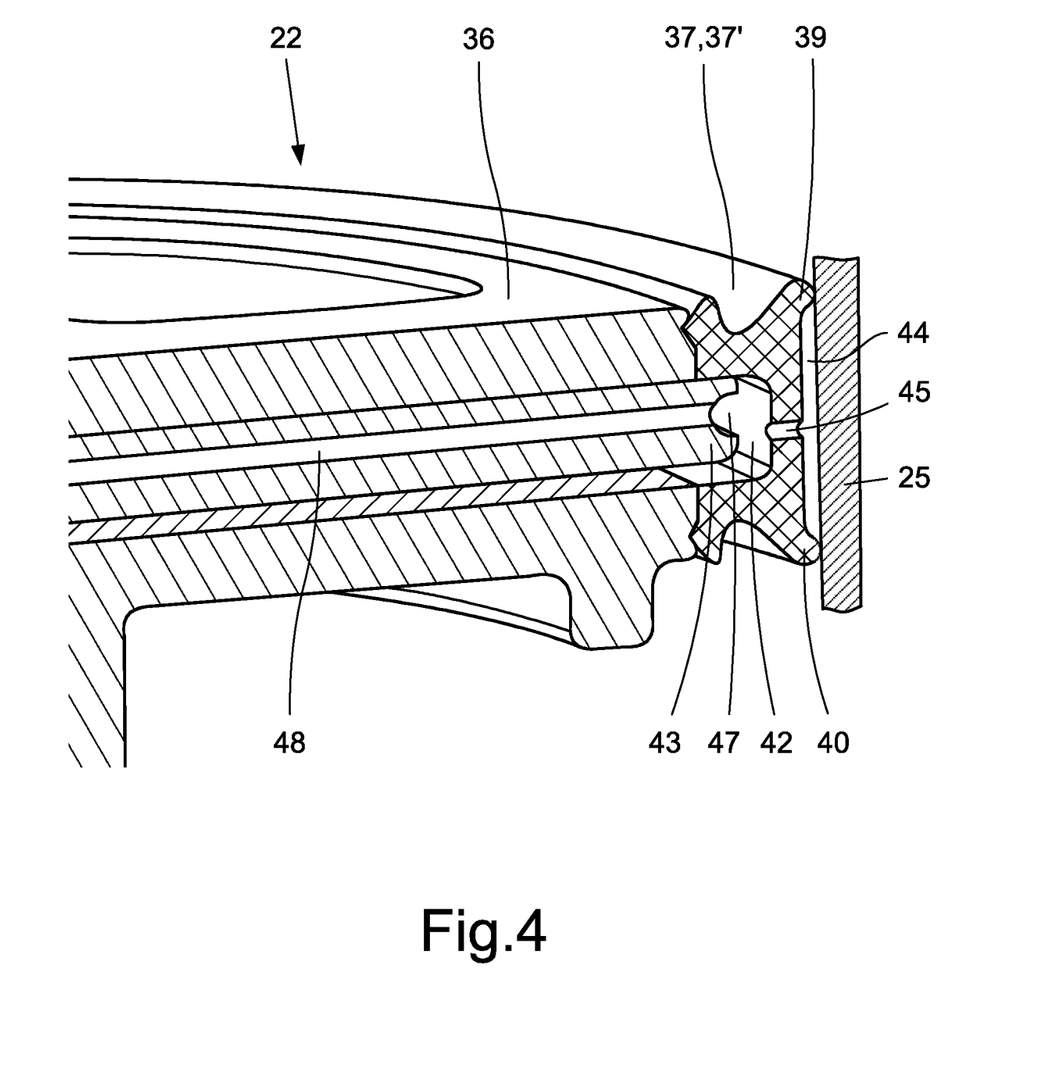
FIG. 4 is a perspective, sectional view of a second variant of the two embodiments of the control piston of the control valve according to the present disclosure according to FIG. 1 and FIG. 2.

Two possible variants of the control piston 22 and of the sealing ring 37, 37', which can be used in conjunction with the two above-described embodiments of the sealing ring 37, 37', will be described in greater detail below with reference to the perspective sectional views of the control piston 22 with graduated cross sections in FIG. 3 and FIG. 4. In the first variant of the control piston 22 and the sealing ring 37, 37' according to FIG. 3, the annular vent space 46 is in the form of a radial annular groove which is formed axially centrally in the bottom wall of the fastening groove 42 of the sealing ring 37, 37'. As a result of this, the vent holes 45 arranged in the sealing ring 37, 37' are designed to be relatively short. In the second variant of the control piston 22 and the sealing ring 37, 37' according to FIG. 4, the annular vent space 47 is formed by a radial annular groove which is formed axially centrally in the outer wall of the fastening web 43 of the control piston 22. The vent holes 45 arranged in the sealing ring 37, 37' are therefore designed to be slightly longer in the case of a thicker sealing ring wall.

While the above description constitutes the preferred embodiments of the present invention, it will be appreciated that the invention is susceptible to modification, variation and change without departing from the proper scope and fair meaning of the accompanying claims.

LIST OF REFERENCE NUMERALS (PART OF THE DESCRIPTION)

1 valve unit
2 first control valve
3 second control valve
4 valve housing
5 upper housing part of the valve housing
6 lower housing part of the valve housing
7 upper housing insert
8 lower housing insert
9 control piston
10 upper poppet valve
11 sealing piston
12 cylinder of the upper housing part
13 compression spring, helical spring
14 inner valve seat
15 guide portion
16 compression spring, helical spring
17 outer valve seat
18 vent channel
19 working pressure chamber
20 supply pressure chamber
21 vent pressure chamber
22 control piston
23 lower poppet valve
24 sealing piston
25 cylinder of the upper housing insert
26 compression spring, helical spring
27 inner valve seat
28 guide portion
29 compression spring, helical spring
30 outer valve seat
31 opening
32 working pressure chamber
33 supply pressure chamber
34 control pressure chamber
35 tubular body
36 piston body
37,37' sealing ring, radial sealing ring
38 inner wall
39 first sealing lip
40 second sealing lip
41 guide portion
42 fastening groove, annular groove
43 fastening web, annular web
44 intermediate space
45 vent hole
46 vent space, annular groove
47 vent space, annular groove
48 vent hole
49 vent channel
50 guide member, guide knob
51 guide member, annular web
52 interruption in the annular web
53 central axis of the control piston
54 indentation on the upper housing part

The invention claimed is:

1. A control valve (3) of a compressed air system of a vehicle, comprising:
   a housing forming a cylinder (25);
   a control piston (22) guided in an axially movable manner in the cylinder (25),
   two pressure chambers (32, 34) being separated from one another by the control piston (22),
   a sealing ring (37, 37') arranged on the outer circumference of the control piston (22, 36) and sealingly engaging an inner wall of the cylinder,
   wherein the sealing ring (37, 37') is a radial sealing ring having an axial length which substantially corresponds to the axial thickness of the control piston (22, 36), wherein the sealing ring (37, 37') has two axial edges, each of which includes one respective radially obliquely outwardly directed sealing lip (39, 40) in contact with the inner wall (38) of the cylinder (25), and wherein a plurality of guide members (50, 51) distributed over the circumference of the sealing ring (37, 37') are formed between the two sealing lips (39, 40) on the sealing ring (37, 37').

2. The control valve as claimed in claim 1, wherein the sealing ring (37, 37') has a fastening groove (42) in the form of a radial annular groove on a radially inner face thereof, the groove, in a mounted state, encompassing a fastening web (43) embodied as a radial annular web arranged on the outer circumference of the control piston (22, 36).

3. The control valve as claimed in claim 2, wherein, between the outer circumference of the piston (22, 36) and the radially inner face of the sealing ring (37, 37'), an annular vent space (46, 47) is formed, which is connected to an intermediate space (44) enclosed between the sealing lips (39, 40) of the sealing ring (37, 37') and the inner wall (38) of the cylinder (25) and to a vent channel (49) formed in the control piston (22) via at least one radial vent hole (45) formed in the sealing ring (37, 37').

4. The control valve as claimed in claim 3, wherein the annular vent space (46) is delimited by a radial annular groove formed axially centrally in a bottom wall of the fastening groove (42) of the sealing ring (37, 37').

5. The control valve as claimed in claim 3, wherein the annular vent space (47) is delimited by a radial annular groove formed axially centrally in an outer wall of the fastening web (43) of the control piston (22, 36).

6. The control valve as claimed in claim 3, wherein the vent channel (49) is a cylindrical or annular tube formed in the control piston (22) centrally or coaxially with a central axis (53) of the control piston (22).

7. The control valve as claimed in claim 3, wherein the annular vent space (46, 47) is connected to the vent channel (49) by at least one radial vent hole (48) formed in the control piston (22, 36).

8. The control valve as claimed in claim 1, wherein the guide members (50) of the sealing ring (37) are radially raised guide knobs enveloped by an outer cylindrical sliding surface and arranged axially centrally between the sealing lips (39, 40).

9. The control valve as claimed in claim 8, wherein the vent holes (45) in the sealing ring (37) are formed substantially centrally over the circumference between the knob-shaped guide members (50).

10. The control valve as claimed in claim 1, wherein the guide member (51) of the sealing ring (37') is a radially raised annular web having an outer cylindrical sliding surface arranged axially centrally between the sealing lips (39, 40) and having interruptions (52) along an circumferential direction.

11. The control valve as claimed in claim 10, wherein the vent holes (45) in the sealing ring (37) are formed in the interruptions (52) of the annular-web-shaped guide member (51).

* * * * *